United States Patent
Héiden et al.

(10) Patent No.: US 8,235,568 B2
(45) Date of Patent: Aug. 7, 2012

(54) SECURITY LIGHTING FOR A VEHICLE

(75) Inventors: David Héiden, Clarkston, MI (US); Randy Johnson, White Lake, MI (US); Sari Rezzo, Ann Arbor, MI (US); Sue Stein, Nashville, TN (US); Kevin Thompson, Fairview, TN (US)

(73) Assignee: Nissan North America, Inc., Franklin, TN (US)

( * ) Notice: Subject to any disclaimer, the term of this patent is extended or adjusted under 35 U.S.C. 154(b) by 266 days.

(21) Appl. No.: 12/713,797

(22) Filed: Feb. 26, 2010

(65) Prior Publication Data
US 2011/0211362 A1    Sep. 1, 2011

(51) Int. Cl.
*B60Q 1/32*    (2006.01)
(52) U.S. Cl. .......... 362/495; 362/487; 362/249.02; 362/311.02
(58) Field of Classification Search .......... 362/495, 362/487, 311.02, 249.02, 500
See application file for complete search history.

(56) References Cited

U.S. PATENT DOCUMENTS

| | | | |
|---|---|---|---|
| 4,439,818 A * | 3/1984 | Scheib | 362/249.06 |
| 4,557,494 A | 12/1985 | Elwell | |
| 5,497,306 A | 3/1996 | Pastrick | |
| 5,709,453 A | 1/1998 | Krent et al. | |
| 5,823,654 A | 10/1998 | Pastrick et al. | |
| 6,077,576 A | 6/2000 | Osborn | |
| 6,250,785 B1 * | 6/2001 | Mallia et al. | 362/511 |
| 6,264,337 B1 | 7/2001 | Rannells, Jr. et al. | |
| 6,416,209 B1 | 7/2002 | Abbott | |
| 6,466,128 B1 * | 10/2002 | Pan | 340/468 |
| 6,502,970 B1 | 1/2003 | Anderson et al. | |
| 6,659,629 B2 * | 12/2003 | Potter et al. | 362/495 |
| 2002/0118547 A1 | 8/2002 | Holthaus | |
| 2002/0172054 A1 * | 11/2002 | Teng | 362/495 |
| 2005/0047167 A1 | 3/2005 | Pederson et al. | |
| 2006/0001294 A1 | 1/2006 | Balgaard et al. | |
| 2006/0274540 A1 | 12/2006 | Klaver et al. | |
| 2007/0019415 A1 | 1/2007 | Leblanc et al. | |
| 2007/0274087 A1 | 11/2007 | Herold | |

OTHER PUBLICATIONS

Subaru, "Puddle Lights—B9 Tribeca Installation Instructions", Steps 1-13.
www.shop3m.com/75347085641.html; 3M Truck Bed Lighting Standard Kit; printed from website Feb. 26, 2010.
www.shop3m.com/75347085633.html; 3M Truck Bed Lighting Deluxe Kit; printed from website Feb. 26, 2010.

* cited by examiner

*Primary Examiner* — Robert May
(74) *Attorney, Agent, or Firm* — Young Basile Hanlon & MacFarlane, P.C.

(57) ABSTRACT

Disclosed herein is a security vehicle lighting system. The system includes a rocker panel trim member arranged to conceal at least a portion of a vehicle rocker panel, the trim member having a lower wall portion having at least one aperture formed therein, the lower wall portion defining an interior surface and an opposing ground-facing surface and extending inboard toward the rocker panel, and at least one light member disposed between the rocker panel and the interior surface and adjacent the at least one aperture, wherein the at least one light member is mounted on the interior surface of the trim member and operable to illuminate a portion of the ground proximate the trim member.

19 Claims, 6 Drawing Sheets

SECURITY LIGHTING FOR A VEHICLE

FIELD OF THE INVENTION

The present invention generally pertains to security lighting for a vehicle and more specifically, exterior security lighting to illuminate ground areas around the vehicle.

BACKGROUND

Modern automotive vehicles include exterior lighting systems. While some of these exterior lighting systems have been mounted in, for example, lights disposed in side view mirrors or the front fender area near a vehicle door, light illuminating from such systems can be obstructed by operation of the vehicle door. These systems may also be ineffective in illuminating a ground area adjacent to and/or under the front and rear vehicle doors. Accordingly, these systems may not provide enough illumination to, for example, enhance security around the vehicle and may not permit detection and/or identification of persons standing or crouching next to the vehicle or persons concealed by the vehicle in dark conditions.

Other vehicles include decorative exterior lighting systems to provide a visual accent thereto. Some of these decorative lighting systems may have, for example, lights mounted on the exterior surface of the vehicle. However, because of their location, some of these lights may be prone to breakage and/or coverage with dirt. Additionally, similar to other exterior lighting systems, some of the decorative lighting systems may be ineffective in illuminating the ground area adjacent to and/or under the front and rear vehicle doors and as such, may not provide adequate security lighting.

SUMMARY

Embodiments of a vehicle lighting system are disclosed herein. In one such embodiment, the system includes a rocker panel trim member arranged to conceal at least a portion of a vehicle rocker panel. The trim member has a lower wall portion having at least one aperture formed therein. The lower wall portion defines an interior surface and an opposing ground-facing surface and extends inboard toward the rocker panel. The system also at least one light member disposed between the rocker panel and the interior surface and adjacent the at least one aperture. The at least one light member is mounted on the interior surface of the trim member and is operable to illuminate a portion of the ground proximate the trim member.

Embodiments of a vehicle structure are also disclosed herein. In one such embodiment, the structure includes a side body structure having a door opening, a floor, a rocker panel, a rocker panel trim member, a plurality of light members and at least one strip section. The rocker panel interconnects the side body structure to the floor proximal to the door opening. The rocker panel trim member is arranged to conceal at least a portion of the rocker panel, The trim member has a lower wall portion having a plurality of apertures formed therein. The lower wall portion defines an interior surface and an exterior surface and extends inboard toward the rocker panel. The plurality of light members are disposed between the rocker panel and the interior surface and adjacent the plurality of apertures. The plurality of light members are operable to illuminate a portion of the ground proximate the trim member. The at least one strip section has an upper surface and an opposing lower surface and extends between at least two light members of the plurality of light members. The at least one strip section is adapted to attach to the interior surface of the trim member.

Embodiments of a method of installing a lighting system in a vehicle having a rocker panel trim member adapted to conceal at least a portion of a rocker panel, the trim member having a lower wall portion defining an interior surface and an opposing ground-facing surface and extending inboard toward the rocker panel are also disclosed herein. In one such embodiment, the method includes forming a plurality of apertures through the lower wall portion. Each of the plurality of light members are positioned between the rocker panel and the interior surface and are adjacent to a corresponding one of the plurality of apertures. The plurality of light members are serially connected by strip sections. The method also includes attaching the strips sections to the interior surface such that the strip sections are flush against the interior surface. Moreover, the method includes electrically connecting the plurality of light members to a power source. The plurality of light members are configured to illuminate a portion of the ground proximate the at least one aperture.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
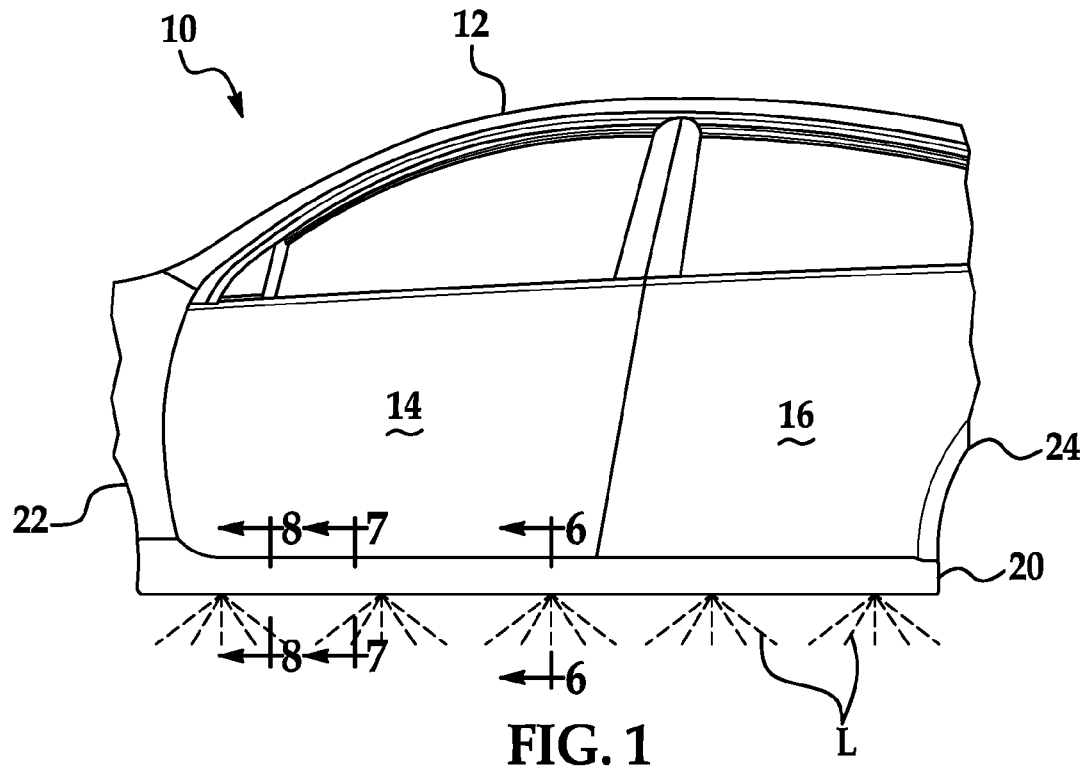
FIG. 1 is a partial side elevation view of a vehicle having a lighting assembly according to one embodiment of the present invention.
Figure 2:
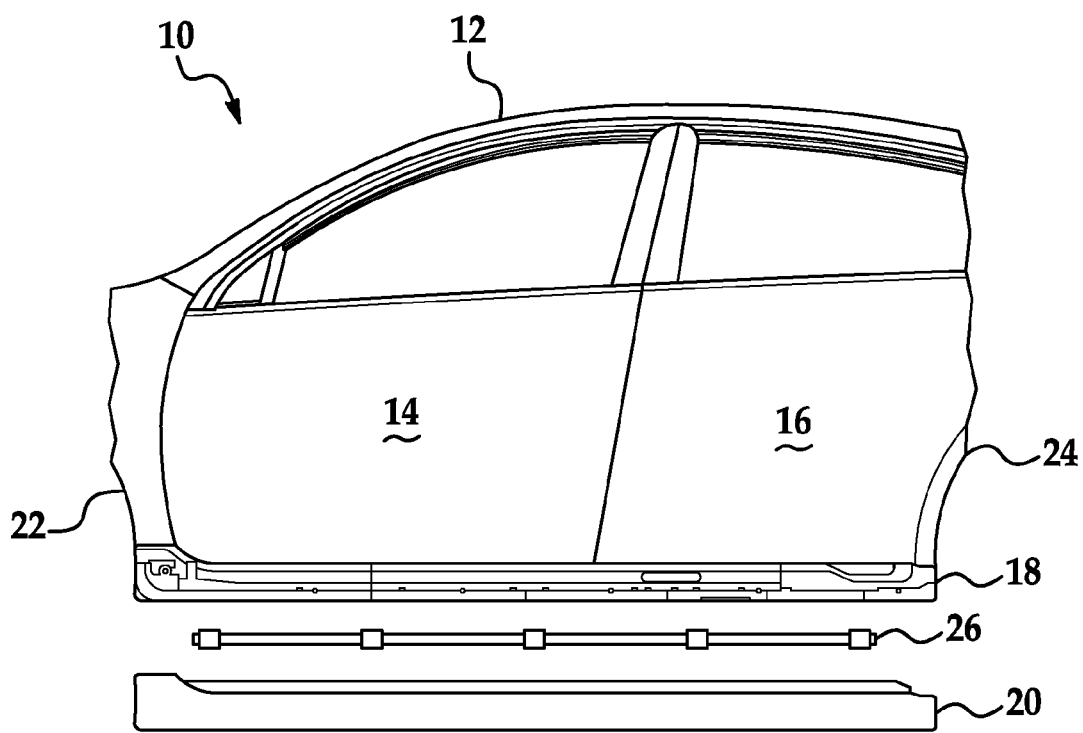
FIG. 2 is an exploded view of the vehicle of FIG. 1.

Referring to FIGS. 1 and 2, a vehicle 10 is illustrated incorporating an exterior lighting system according to one embodiment of the invention. The vehicle 10 includes a vehicle body 12, a front door 14, a rear door 16, a rocker panel 18 and a rocker panel trim member 20, The rocker panel 18 extends between a front wheel well 22 and a rear wheel well 24 along the bottom sides of the vehicle 10. When installed, the rocker panel trim member 20 conceals or covers all or a portion of the rocker panel 18. A lighting assembly 26, which will be discussed in more detail below, is disposed between the trim member 20 and the rocker panel. The lighting assembly provides light L from the trim member 20, which in turn illuminates the ground (or a portion thereof) proximate the trim member 20.

Although only one side of the vehicle 10 is shown in FIGS. 1 and 2, rocker panel 18 and rocker panel trim member 20 can extend on the other side of the vehicle (not shown) and can also incorporate the lighting system embodiment described herein. However, in other embodiments, the lighting system may be incorporated only in one side of the vehicle (e.g. driver side).

Figure 6:
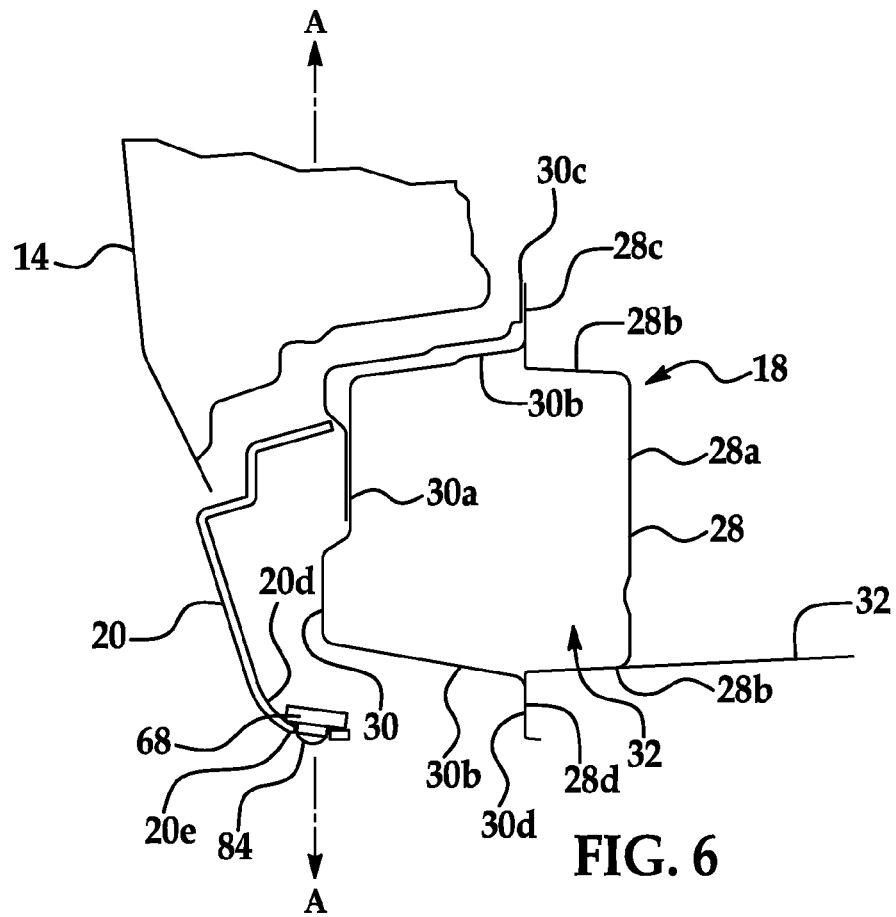
FIG. 6 is a cross section view of the vehicle taken along line 6-6 of FIG. 1.
Figure 7:
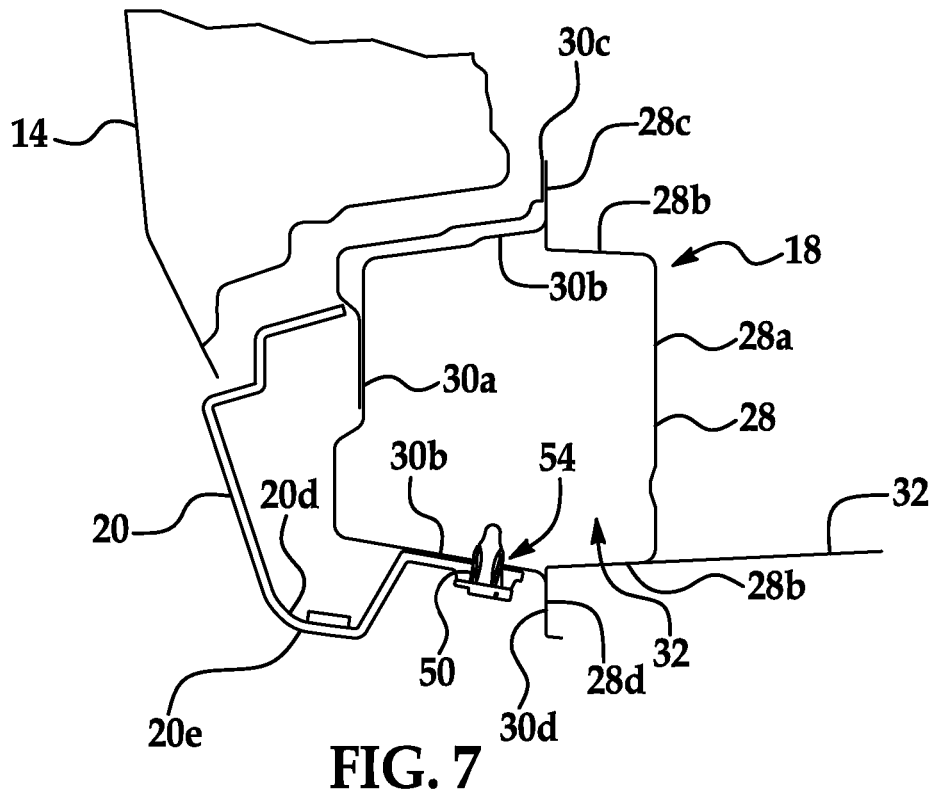
FIG. 7 is a cross section view of the vehicle taken along line 7-7 of FIG. 1.
Figure 8:
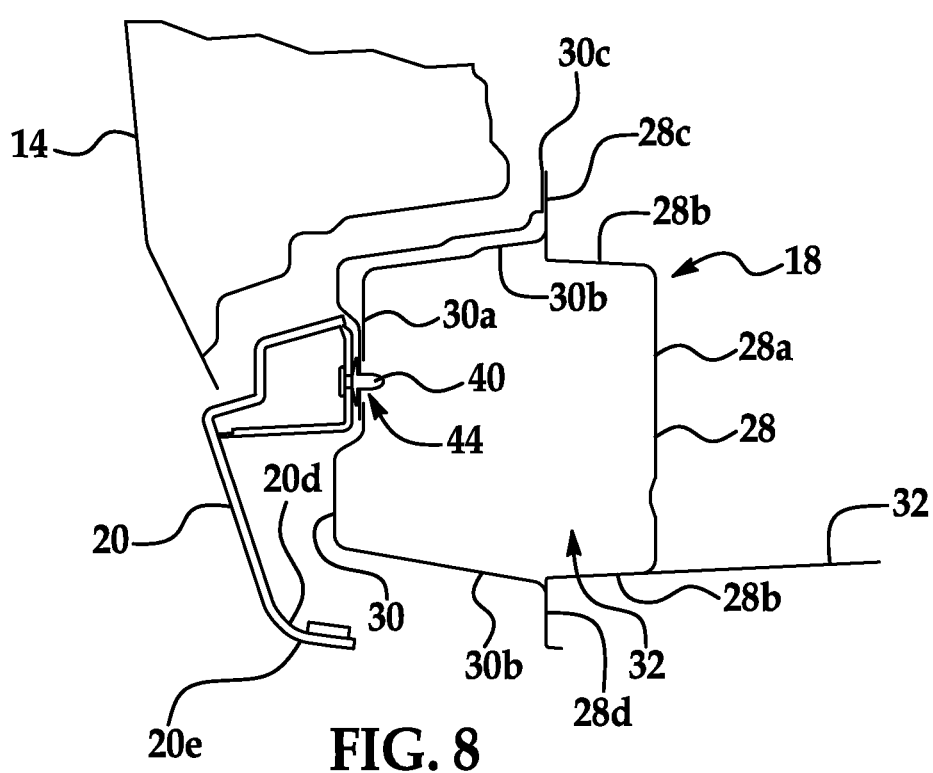
FIG. 8 is a cross section view of the vehicle taken along line 8-8 of FIG. 1.

Referring to FIGS. 6-8, the rocker panel 18 can include a rocker panel inner member 28 and a rocker panel outer member 30. The inner member 28 can be joined to the outer member 30 to form a space therebetween. The rocker panel inner member 28 can be secured to a portion of a floor 32 of the vehicle 10.

The inner member 28 includes a vertically extending base portion 28a and lateral side portions 28b horizontally extending outboard therefrom. The base portion 28a and side portions 28b can define a generally U-shaped cross-section. The inner member 28 also includes upper flange 28c and a lower flanges 28d extending vertically from the side portions 28b.

The outer member 30 includes a vertically extending base portion 30a and lateral side portions 30b horizontally extending inboard therefrom. The base portion 30a and side portions 30b can define a generally U-shaped cross-section. The outer member 30 also includes an upper flange 30d and a lower flange 30d extending vertically from the side portions 30b. As discussed previously, the inner member 28 can be connected to the outer member 30. As illustrated, the inner member 28 and the outer member 30 are connected at the upper flanges 28c and 30c and at the lower flanges 28d and 30d by, for example, welding. As will be discussed in more detail below, the outer member 30 can also include an opening in the base portion and an opening in the lower flange such that the trim member 20 can be attached thereto.

Of course, the rocker panel 18 described herein is merely exemplary and other suitable structures for rocker panels are available. For example, a rocker panel may also include a structure in addition to the inner and outer members such as an additional reinforcement member. Alternatively, the inner and outer members may be joined at a location other than the flanges.

Figure 3:
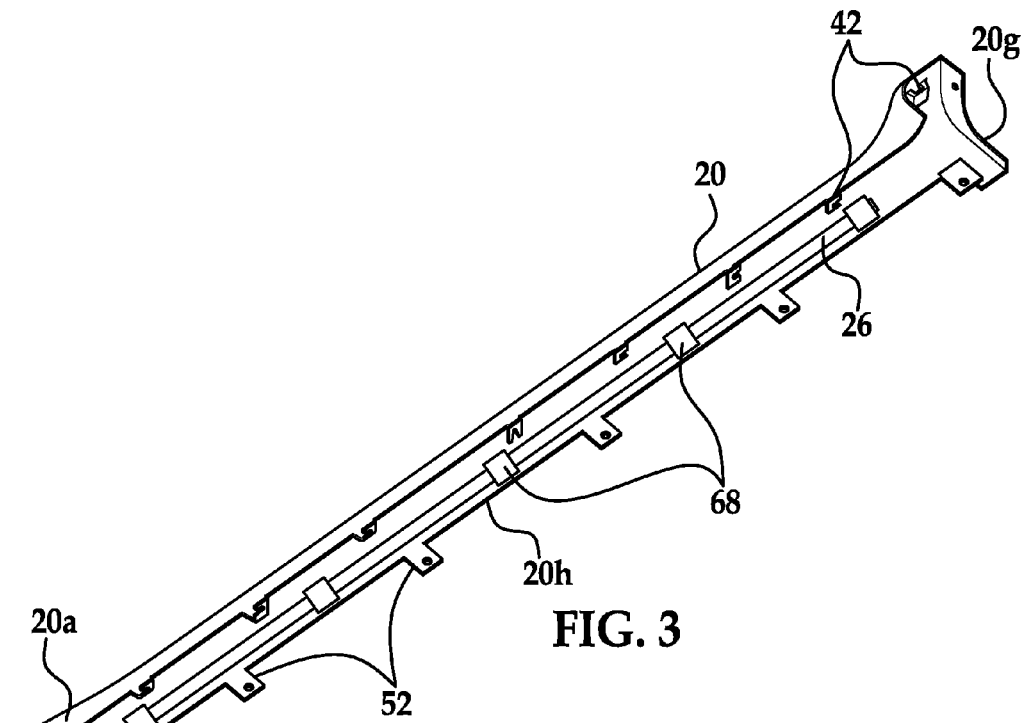
FIG. 3 is a perspective view of a rocker panel trim member and lighting assembly of FIG. 1.
Figure 4:
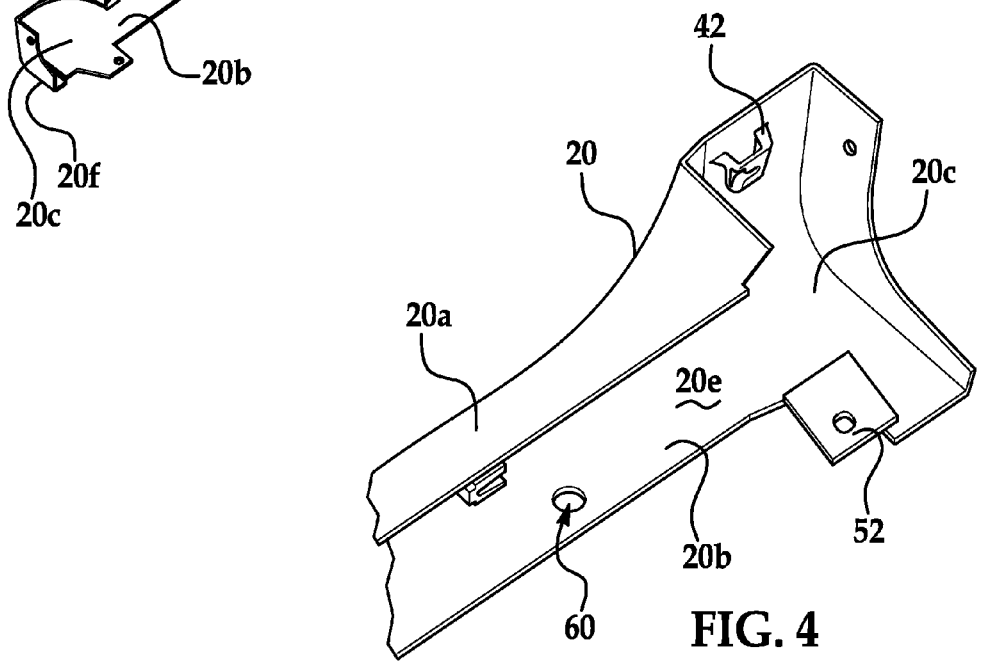
FIG. 4 is an enlarged partial perspective view of the rocker panel trim member of FIG. 3 without the lighting assembly.

Referring to FIGS. 3 and 4, the rocker panel trim member 20 conceals or covers the outer member 30. The rocker panel trim member 20 includes an upper wall portion 20a, a lower wall portion 20b and a central wall portion 20c. The central wall portion 20c interconnects the upper wall portion 20a and lower wall portion 20b to form a generally C-shaped cross-section. The lower wall portion 20b may be rounded, rectilinear or any other configuration. The lower wall portion 20b includes an interior surface 20d and an opposing ground-facing surface 20e. A ground-facing surface is a surface generally facing the ground such that light emanating therefrom or therethrough will illuminate the ground. For example, as shown in FIG. 6, the ground-facing surface 20e lower wall portion 20b is oriented generally horizontally in comparison to an axis A-A such that light emanated therefrom or therethrough will illuminate the ground. However, the ground-facing surface 20e may be oriented at an angle significantly different from that shown in the Figures (i.e. oriented upwardly) and still be sufficiently facing the ground to provide sufficient ground illumination. The ground-facing surface 200 may be a continuous surface or may be interrupted by apertures (whether decorative or functional). Other suitably-shaped trim members are also available as desired or required.

Any suitable fastening means may be employed to secure the trim member 20 to the rocker panel 18. When secured, the lower wall portion 20b can extend inboard toward the rocker panel 18. By way of example and not limitation, the upper wall portion 20a of the trim member 20 can be secured to the base portion 30a of the outer member 30 using an attachment member 40 such as a retaining clip. Other suitable attachment members are available. Alternatively, the upper wall portion 20a of the trim member 20 and/or base portion 30a of the outer member 30 can include integrated attachment members or be welded together. The attachment members can be inserted into clip retaining slots 42 in the trim member 20 and can then be aligned with and secured to corresponding mounting holes 44 in the base portion 30a.

Further, for example, the lower wall portion 20b of the trim member 20 can be secured to the lower flange 30b of the outer member 30 using an attachment member 50 such as a panel clip. Other suitable attachment members are available. Alternatively, the lower wall portion 20b of the trim member 20 and/or lower flange 30b of the outer member 30 can include integrated attachment members or be welded together. The panel clips 50 can be inserted into mounting holes 52 in the trim member 20 and can then be aligned with and secured to corresponding mounting holes 54 in the lower flange of the outer member 30.

The lower wall portion 20b can include one ore more through-hole apertures 60 such that light from the lighting assembly 26 can illuminate a portion of the ground proximate the trim member 20 and/or the aperture 60. If there is more than one aperture 60, they can be uniformly spaced along the lower wall portion. Alternatively, the apertures can be non-uniformly spaced or may be dependent on the structure of the lighting assembly as will be discussed in more detail below.

The lighting assembly 22 can be disposed between the trim member 20 and the interior surface 20e of the lower wall portion 20b. The lighting assembly 22 can include one or more interconnected light members 68 electrically connected by strip sections 70. Each strip section 70 can be a flexible flat cable that can serially connect the light members 68. The light members 68 can be connected together, for example, by wires integrated within the flat cable. In other embodiments, the lighting assembly 22 can be composed of, for example, one light member 68. Further, the light members 68 may be positioned other than in a strip fashion. For example, the light members 68 may be staggered along the lower wall portion 20b. Alternatively, more than one lighting assembly can be incorporated between the trim member 20 and the interior surface 20e of the lower wall portion.

Each light member 68 can be aligned with and correspond to one of the apertures 60 of the lower wall portion 20e. The light member 68 can either be adjacent to the aperture 60, fully mounted within the aperture 60, partially mounted within the aperture 60, positioned above the aperture 60 or positioned and/or mounted in any other suitable manner to illuminate a ground portion adjacent to and/or under the trim member 20 or the aperture 60. Light emanating from the light member 68 can either be emitted through the aperture or can be emitted below the aperture.

Figure 5A:
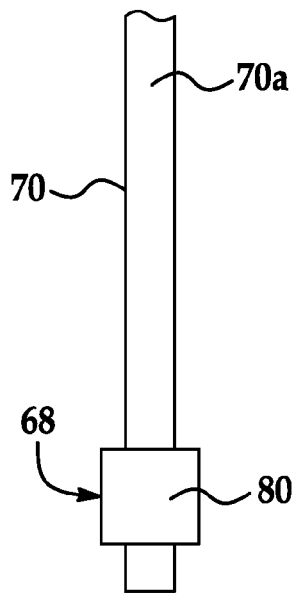
FIG. 5A is a bottom plan view of a light member of the lighting assembly of FIG. 1.
Figure 5B:
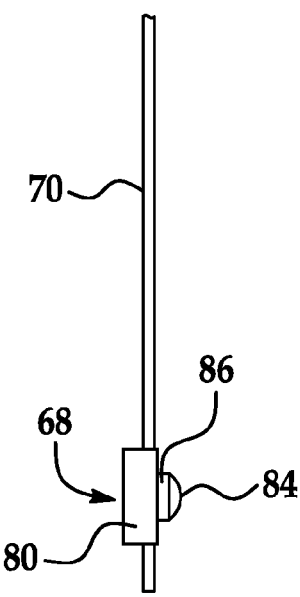
FIG. 5B is a side elevation view of the light member of FIG. 5A.
Figure 5C:
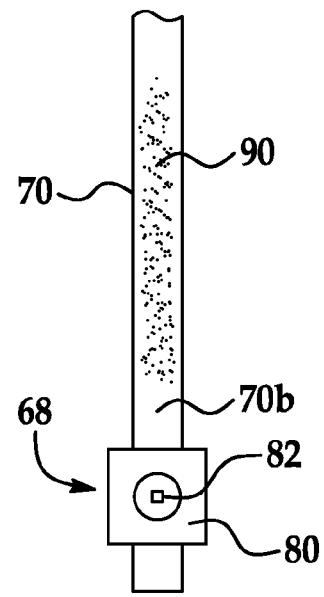
FIG. 5C is a top plan view of the light member of FIG. 5A.

Referring to FIGS. 5A-5C, each light member 68 can include a base 80, an LED 82 mounted on the base 80 and a light lens 84. Any type of LED 82 may be utilized as desired or required. For example, the LED 82 can be a surface-mount LED. The LED 82 can be mounted to the base 80 by solder, a snap-fit connection, or other means. The LED 82 can produce white light. However, LEDs that produce blue light, ultraviolet light or other wavelengths of light can be used in place of white light emitting LEDs.

The base 80 has an annular ridge 86 sized and configured to receive the lens 84. Together, the lens 84 and base 80 can protect the LED 82 from water, mud, or other contamination. The lens 84 can be sized and configured to fit snugly into the apertures 60. In this manner, the lens 60 can act as a locator in assisting a person installing ("installer") the lighting assembly 26 and be dome-shaped. Alternatively, the lens may be convex, planar or have any other suitable shape. The lens 84 can also disperse light from the LED 82 and additionally, can assist in providing an even distribution of light by, for example, include diffracting structures. Of course, the specific configuration of the light member 68 is exemplary and other suitable light members are available. For example, a light member can include more than one LED.

As illustrated, the lens 84 of each of the light members 68 is positioned within each of the apertures 60. The strip sections 70 can each include a top surface 70*a* and an opposing lower surface 70*b*. The strip sections can be attached to the lower portion by an adhesive section 90 located on the lower surface 70*b* of each of the strip sections. In one embodiment, the adhesive section 90 can be adhesive tape. The adhesive section 90 can be of a dimension to suitably attach the strip section 70 to the trim member 20. For example, the adhesive section 90 may be four inches in length. Before installation, the adhesive section 90 can be covered by an adhesive protective strip section (not shown) so that the adhesive does not accidentally attach to an unintended surface.

The lighting assembly 22 is mounted, as described previously, such that it is substantially or entirely enclosed by the trim member 20. Accordingly, the light members 68 and strip sections 70 may be protected from environmental conditions (e.g. rain, snow, etc.) or other contaminants (e.g. mud, rocks, etc.). Further, since the lighting assembly 22 is enclosed by the trim member 20, the lighting assembly 22 can resist the collection of debris and/or contaminants thereon. In some embodiments, the lens 84 may be the only portion of the lighting assembly 22 that is exposed to the external environment. As such, the lens 84, as described previously, can function, in addition to the trim member 20, to protect components of the lighting assembly 22.

Figure 9:
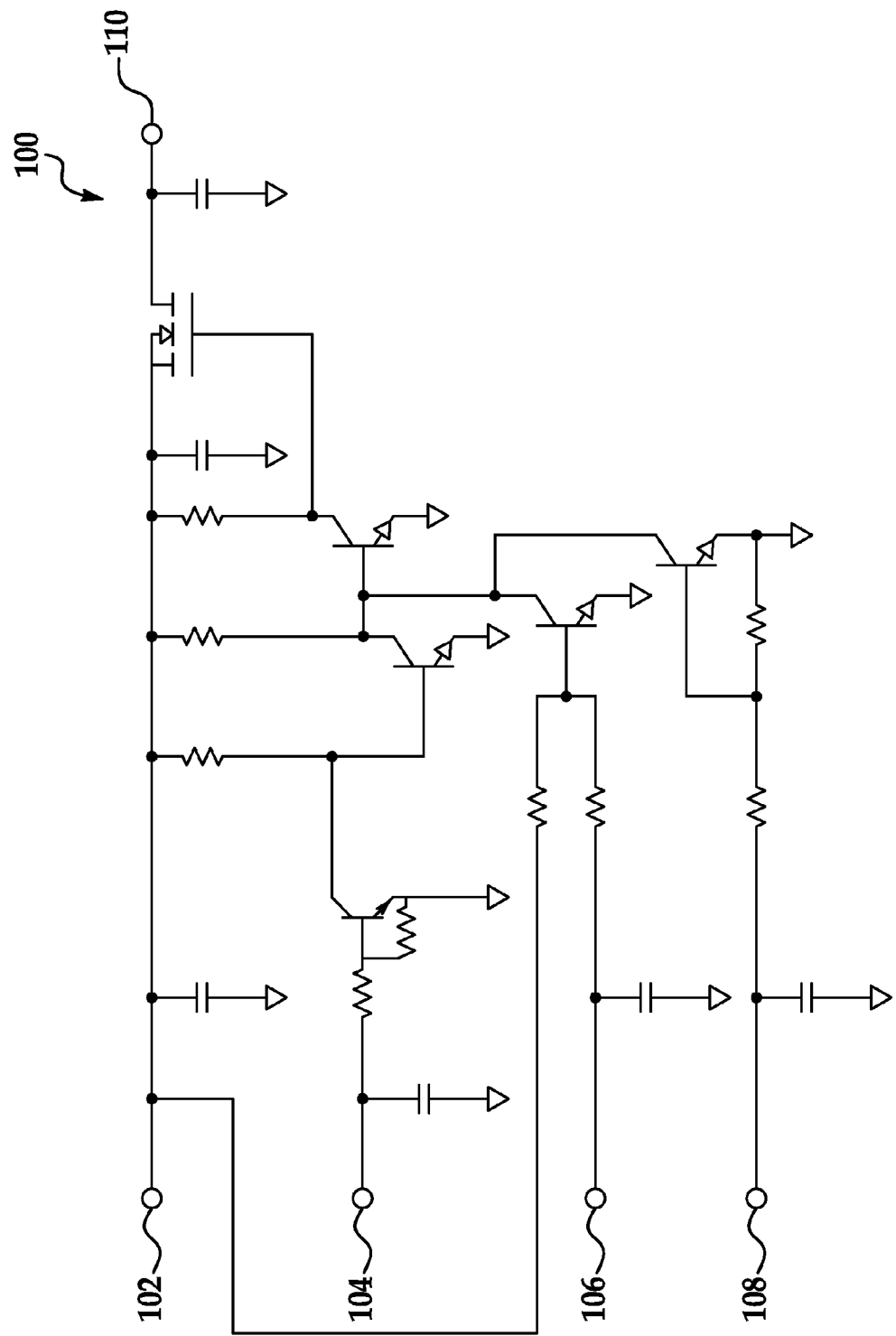
FIG. 9 is a schematic diagram of circuitry used to power the lighting assembly of FIG. 1.

Referring to FIG. 9, a circuit diagram 100 is shown for providing power to the lighting assembly 26 from a source. The circuit can be designed such that a power signal 102 is not provided to the light assembly 26 at output 110 when a battery saver signal 104 is ON, the room lamp signal 106 is OFF or the ignition signal 108 is ON. In other words, when the battery saver signal 104 is OFF, the room lamp signal 106 is ON and the ignition signal 108 is OFF, power can be provided to light the lighting assembly 26 from the source. The battery saver signal 104 can indicate whether the vehicle 10 is operating in a mode to conserve battery power. The room lamp signal 106 can indicate whether the room lamp or dome light of the vehicle 10 is activated. The ignition signal 108 can indicate whether the engine has been started. The circuitry can be designed such that when the room lamp signal 104 is turned on, the lighting assembly is also turned on. The circuitry may further be designed to include a dimmer circuit to dim the LED(s) 82. Since, for example, the lighting assembly 26 is of a simplistic structure, the circuitry can be such that there is a low current draw to power the LED(s) 82. Of course, other suitable electrical circuitry is available for power the lighting assembly 26. The components contained in the circuitry can be dependent on a variety of factors, including but not limited to, the structure of the lighting assembly 26, the electrical arrangement of the vehicle, etc. For example, some lighting assemblies may require a higher current draw to power the LEDs or other light sources contained therein.

Embodiments of the present invention include a lighting system that can be cheaply and quickly installed on one or both sides of the vehicle, and which can sufficiently illuminate the ground areas underneath and near the trim member 20. For example, in one embodiment, the lighting assembly 26 may be sold as an aftermarket accessory. To install the lighting assembly 26 in the vehicle 10, the trim member 20 can be removed from one or both sides of the vehicle 10. The trim member 20 may be removed by, for example, removing attachment members 40 (if any) and/or attachment members 50 (if any) and any other securing member used to attach the trim member 20 to the rocker panel 18.

If apertures 60 are not included in the trim member 20, the installer may create them. To indicate where the first aperture 60 should be positioned, the installer can measure a first predetermined distance from one end 20*f* or 20*g* of the trim member 20 and a second predetermined distance from an edge 20*h* of the lower wall portion 20*b*. For example, the first aperture 60 can be positioned 520 mm from one of the ends 20*f* or 20*g* and 13 mm from the edge 20*h*. Of course, these distances are merely exemplary and the apertures 60 can be located at any other position. Further, in other embodiments, there may be other methods of determining where the apertures are located. Using the lighting assembly 26 as a guide, marks for the remaining apertures can be designated at approximately the same location where the lighting member is located on the lighting assembly. Once all of the designations have been marked, the apertures 60 can be created using, for example, a drill. Each of the apertures 60 can be cleaned such that the aperture has smoothed edges.

After the apertures 60 have been created, the lighting assembly 26 can be placed over the apertures 60 to check for proper alignment. A cleaning pad such as an alcohol preparation pad can be used to wipe down the area(s) that the lighting assembly 26 will be attached to. Once the surface has dried, the trim member 20 can be optionally coated with an automotive adhesion promoter.

The installer can use the lens 84 of each light member 68 to locate and align the light member 68 over the aperture 60. The installer can then press firmly until the light member 68 has been inserted into the aperture 60. The adhesive protective strip section (if any) on the strip section 70 adjacent to the light member 68 being positioned may be removed to reveal the adhesive. The strip section 70 can then be attached to the lower portion 20*b* such that it is flush against the interior surface 20*e* of the lower wall portion 20*b*.

Once the light members 68 have been positioned within the apertures 60, the lighting assembly 26 may be electrically connected to provide power thereto. In some embodiments, the lighting assembly 26 may be connected such that the lighting assembly turns ON when the room lamp turns ON and the lighting assembly 26 turns OFF when the room lamp turns OFF. Other electrical connections can be made as shown and described in FIG. 9. Thus, as discussed previously for example, the lighting assembly 26 can be electrically connected such that it turns OFF when the ignition turns ON.

Figure 10:
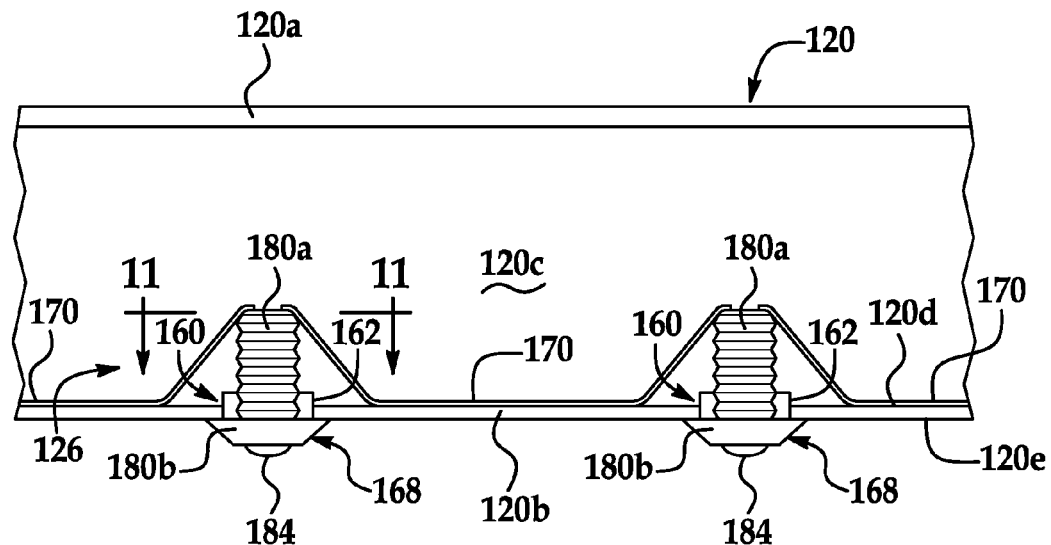
FIG. 10 is a side elevation view of a rocker panel trim member and lighting assembly according to another embodiment of the present invention.
Figure 11:
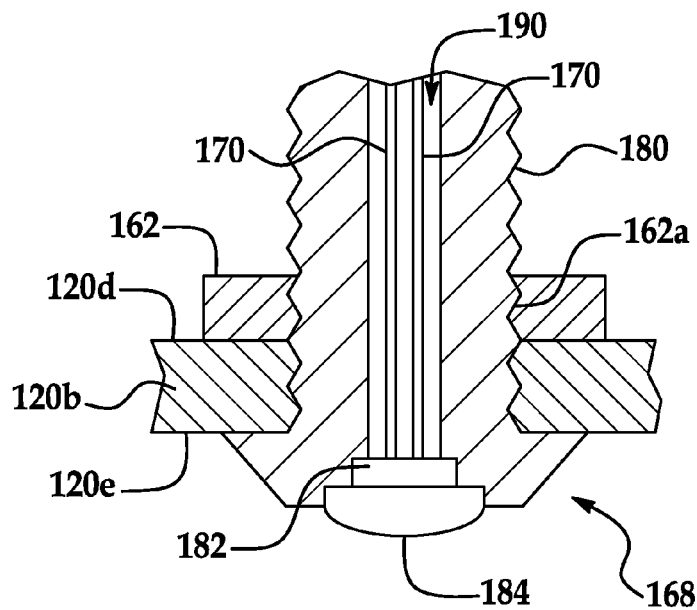
FIG. 11 is a cross section view take along line 11-11 of FIG. 10.

Referring to FIGS. 10 and 11, a rocker panel trim member 120 having a lighting assembly 126 is shown according to another embodiment of the present invention. Trim member 120 is similar to trim member 20 described above in that it includes an upper wall portion 120*a*, a lower wall portion 120*b* and a central wall portion 120*c*. Further, the lower wall portion 120*b* includes an interior surface 120*d* and an opposing ground-facing surface 120*e*. Similar to the previous embodiment, the lower wall portion 120b can include one ore more through-hole apertures 160 such that light emitted from the lighting assembly 126 can illuminate a portion of the ground proximate the trim member 120 and/or the aperture 160. In this embodiment, however, the lighting assembly 126 includes one or more light members 168. Light member 168 includes a bolt 180 containing a LED 182 and a lens 184.

The bolt 180 includes a threaded shaft portion 180a and a head portion 180b. The bolt 180 can be inserted into the aperture 160 and secured by a nut 162. The nut 162 can be threaded onto the shaft portion 180a until it is tightened thereon. The LED 182 can be mounted within the bolt 180 and covered by the lens 184. The LED 182 can be similar to the LED 82 of the first embodiment. The lens 184 can again be dome-shaped although other suitable lenses are available. The lens 184 may or may not extend past the head portion 180b or the lens 194 can be flush with the head portion 180b. The bolt 180 and the lens 184 can protect the LED 182 from water, dirt or other contamination. The bolt 180 can also include a passageway 190 therethrough for passing strip sections 170. Each strip section 170 can be similar to strip section 70 and be a flexible flat cable that can serially connect the LEDs 182 of light members 168 to a power source (not shown). The LEDs 182 can be connected together, for example, by wires integrated within the flat cable. In other embodiments, the LEDs 182 can be electrically connected in any other suitable manlier. Further, in other embodiments, light member 168 can be a fastening device other than a bolt. For example, the light member may be a screw, clamp or other device. Further, the light member 162 may or may not be secured by a nut. For example, the through-hole aperture 160 could contain an integral threaded portion to which the fastening element may be threaded thereon or the light member 162 can be secured by other means such as glue, welded, etc.

The light member 168 can be positioned and secured such that the shaft portion 180a extends at least partially between the rocker panel and the lower wall portion 120b. As shown, the head portion 180b extends below the lower wall portion 120b, although in other embodiments, the light member 168 (including the head portion 180b) can be disposed solely above the lower wall portion 120b. Thus, for example, the light member 168 can be secured to another structure other than the lower wall portion 120b. In other embodiments, the light member 168 can be secured such that it does not extend below the lower wall portion 120b but can extend to partially or totally within the aperture 160. In other words, the lens 184 can extend above, within or below the aperture 160. Of course, the light member 168 can be positioned in any other manner to sufficiently illuminate a portion or all of the ground proximate the trim member 120 or aperture 160.

Embodiments of the invention are not limited to a lighting assembly containing LEDs and may contain any other lighting source or lighting structure that can be mounted on or located within or near the trim member. For example, other embodiments may include a lighting assembly using incandescent lamps, halogen lamps, any other suitable type of lamps or any combination thereof (including in combination with LEDs). These lamps may be positioned or mounted on or within plastic tubes, other lighting strips or any other suitable structure. Although some of the embodiments of the present invention have described the lighting assembly as being added to the vehicle as an aftermarket accessory, the lighting assembly may be integrated within the vehicle during production.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A vehicle structure, comprising
a side body structure having a door opening;
a floor;
a rocker panel interconnecting the side body structure to the floor proximal to the door opening;
a rocker panel trim member arranged to conceal at least a portion of the rocker panel, the trim member having a lower wall portion having a plurality of apertures formed therein, the lower wall portion defining an interior surface and an exterior surface and extending inboard toward the rocker panel;
a plurality of light members disposed between the rocker panel and the interior surface and adjacent the plurality of apertures, the plurality of light members operable to illuminate a portion of the ground proximate the trim member; and
at least one strip section having an upper surface and an opposing lower surface and extending between at least two light members of the plurality of light members, the strip section adapted to attach to the interior surface of the trim member.

2. The vehicle lighting system of claim 1, wherein at least a portion of each of the plurality of light members is positioned in a corresponding one of the plurality of apertures.

3. The vehicle lighting system of claim 1, wherein each of the plurality of light members is positioned to emit light through a corresponding one the plurality of apertures.

4. The vehicle lighting system of claim 1, wherein each of the plurality of light members extend through and project from a corresponding one of the plurality of apertures.

5. The vehicle lighting system of claim 1, wherein the plurality of light members are mounted on the interior surface of the trim member.

6. The vehicle lighting system of claim 1, wherein each of the plurality of light members comprises:
a base;
a light source mounted on the base; and
a lens projecting from the base, the lens sized and configured to be mounted in a corresponding one of the plurality of apertures.

7. The vehicle lighting system of claim 6, wherein the light source is an LED.

8. The vehicle lighting system of claim 6, wherein the lens is configured to at least one of protect the light source and disperse light from the light source.

9. The vehicle lighting system of claim 6, wherein the lens is dome-shaped.

10. The vehicle lighting system of claim 6, wherein the lens extends through and projects from one of the plurality of apertures.

11. The vehicle lighting system of claim 1, wherein the trim member has a central wall portion interconnecting an upper wall portion and the lower wall portion to form a generally C-shaped cross-section.

12. The vehicle lighting system of claim 1, wherein at least one of the upper wall portion and the lower wall portion include attachment members adapted to connect to the rocker panel.

13. The vehicle lighting system of claim 1, wherein the at least one strip section includes a plurality of strip sections, each of the plurality of strip sections extending between at least two corresponding of the plurality of light members.

14. The vehicle lighting system of claim 1, wherein the at least one strip section is adapted to attach to the interior surface of the trim member using an adhesive tape located on the lower surface thereof.

15. The vehicle lighting system of claim 1, wherein the at least one strip section includes wires configured to electrically connect the plurality of light members.

16. The vehicle lighting system of claim 1, wherein each of the plurality of light members comprises:
- a bolt having a shaft portion and a head portion, the shaft portion extending between the rocker panel and the interior surface;
- a light source mounted within the head portion; and
- a lens disposed within the head portion and over the light source.

17. A method of installing a lighting system in a vehicle having a rocker panel trim member adapted to conceal at least a portion of a rocker panel, the trim member having a lower wall portion defining an interior surface and an opposing ground-facing surface and extending inboard toward the rocker panel, comprising:
- forming a plurality of apertures through the lower wall portion;
- positioning each of the plurality of light members between the rocker panel and the interior surface and adjacent to a corresponding one of the plurality of apertures, wherein the plurality of light members are serially connected by strip sections;
- attaching the strips sections to the interior surface such that the strip sections are flush against the interior surface; and
- electrically connecting the plurality of light members to a power source, the plurality of light members configured to illuminate a portion of the ground proximate the at least one aperture.

18. The method of claim 17, wherein the plurality of light members each include a base, a light source mounted on the base and a lens projecting from the base, the lens sized and configured to be mounted in one of the plurality of apertures, wherein positioning the plurality of light members further comprises:
- aligning the lenses of each of the plurality of light members in the plurality of apertures.

19. The method of claim 17, wherein electrically connecting the plurality of light members, further comprises:
- electrically connecting the plurality of light members to a power signal for a room lamp such that the plurality of light members turn at least one of ON when the room lamp turns ON and OFF when the dome light turns OFF.

* * * * *